J. E. SYMONS.
GYRATORY CRUSHER.
APPLICATION FILED JULY 28, 1910.
1,101,668.
Patented June 30, 1914.
6 SHEETS—SHEET 2.
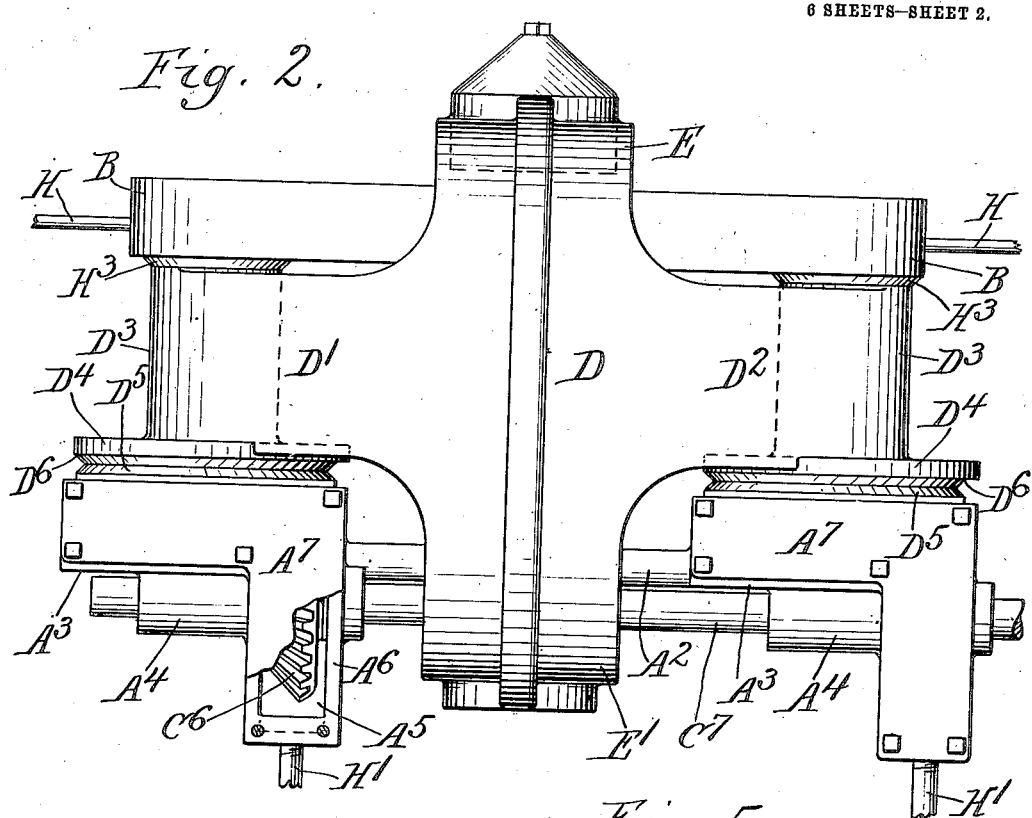
Fig. 2.
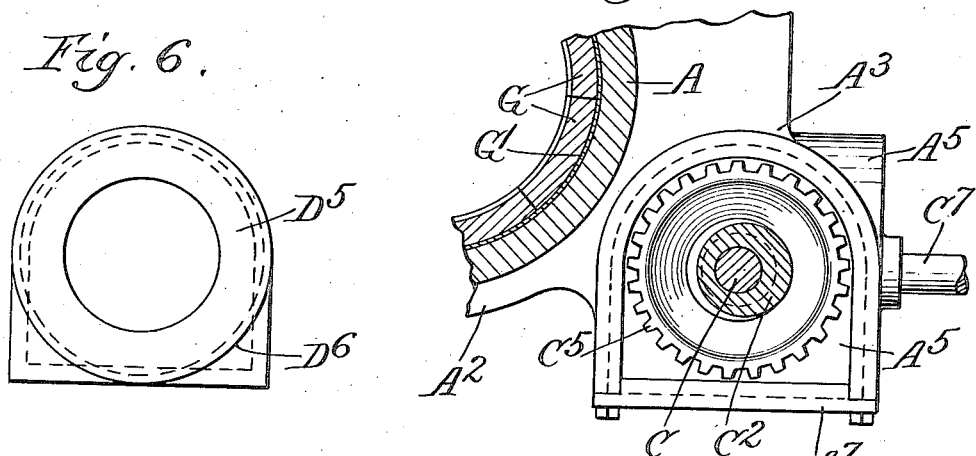
Fig. 6.
Fig. 5.
Witnesses.
Edward T. Wray.
Sophie B. Werner
Inventor.
Josiah E. Symons.
by Parker & Carter
Attorneys.

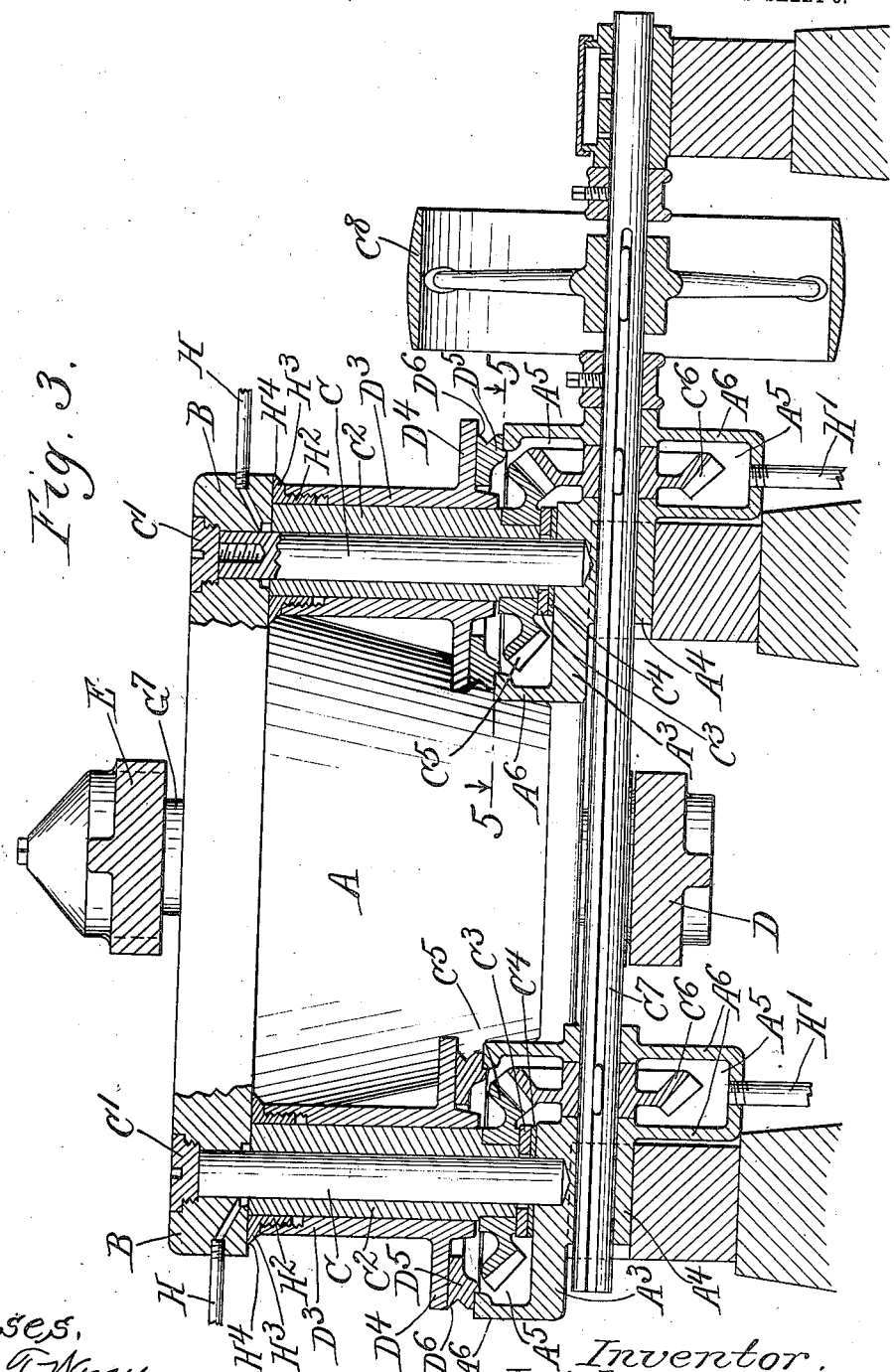

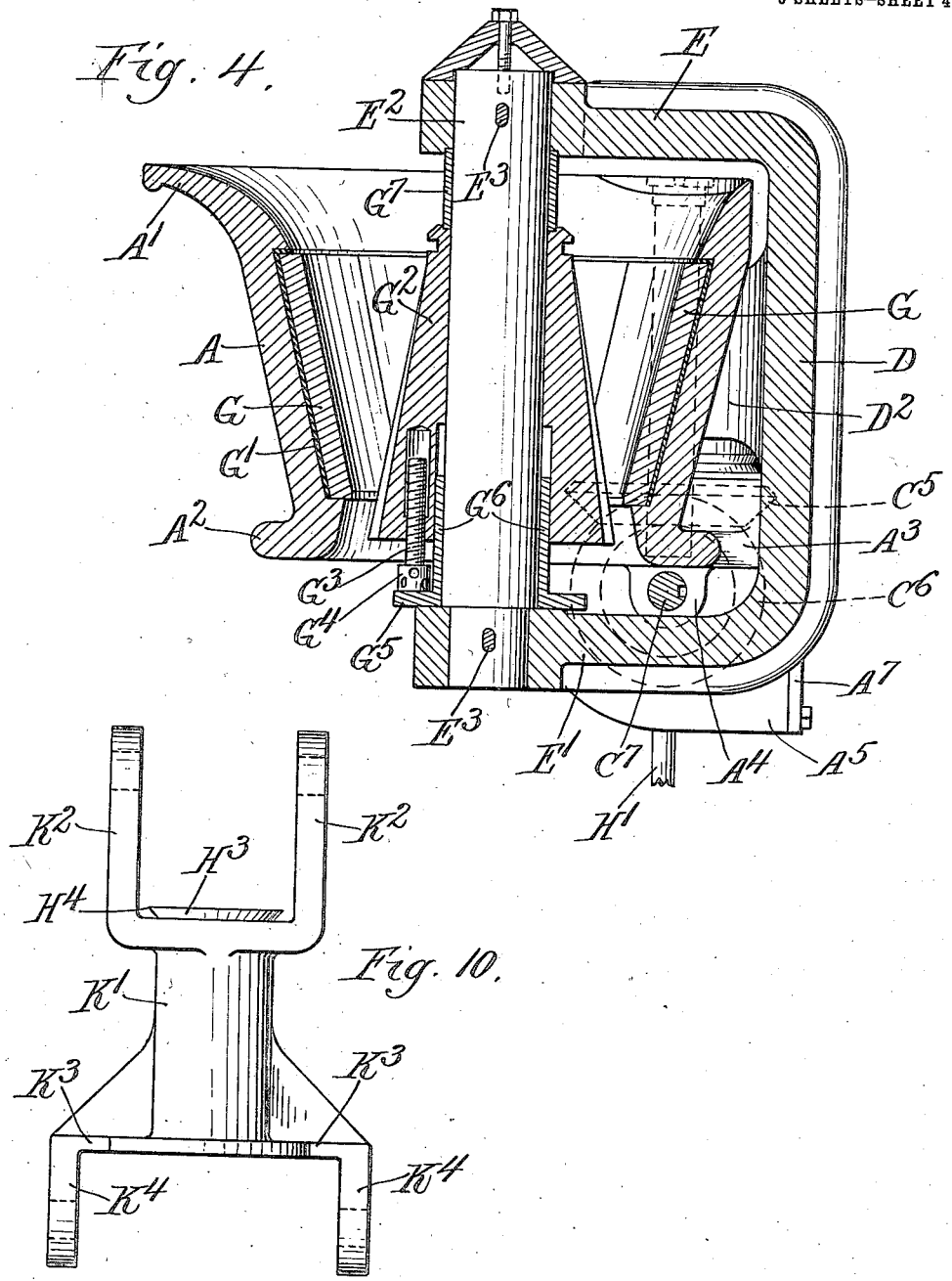

J. E. SYMONS.
GYRATORY CRUSHER.
APPLICATION FILED JULY 28, 1910.

1,101,668.

Patented June 30, 1914.
6 SHEETS—SHEET 5.

Witnesses.
Edward T. Wray.
Sophie B. Werner.

Inventor.
Josiah E. Symons.
by Parker & Carter
Attorneys.

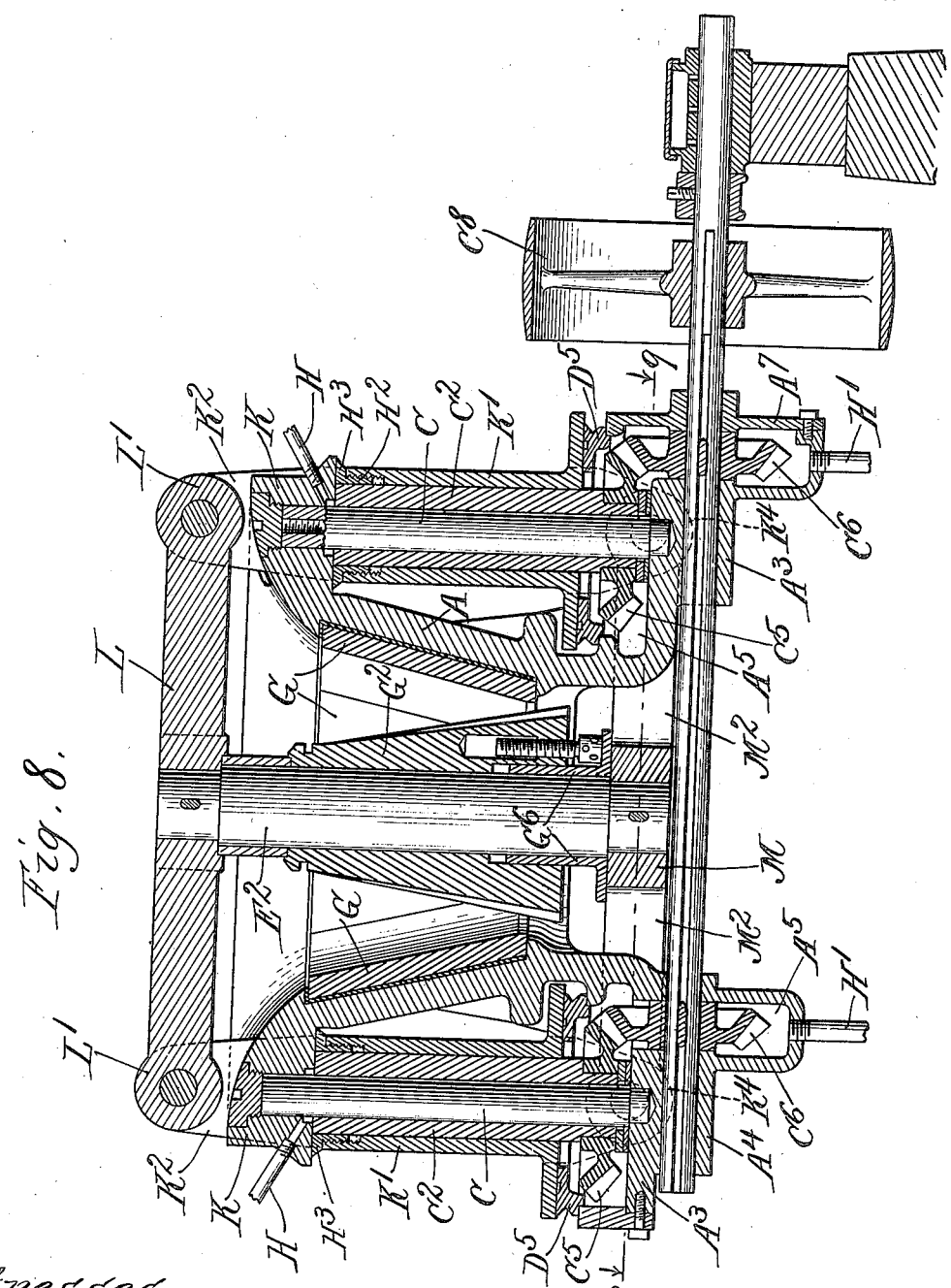

UNITED STATES PATENT OFFICE.

JOSIAH E. SYMONS, OF CHICAGO, ILLINOIS.

GYRATORY CRUSHER.

1,101,668.

Specification of Letters Patent. Patented June 30, 1914.

Application filed July 28, 1910. Serial No. 574,233.

*To all whom it may concern:*

Be it known that I, JOSIAH E. SYMONS, a citizen of the United States, residing at Chicago, in the county of Cook and State of Illinois, have invented a certain new and useful Improvement in Gyratory Crushers, of which the following is a specification.

My invention relates to improvements in gyratory crushers and has for its object to provide a new and improved form of such a device.

It is illustrated in the accompanying drawings, wherein—

Figure 1:
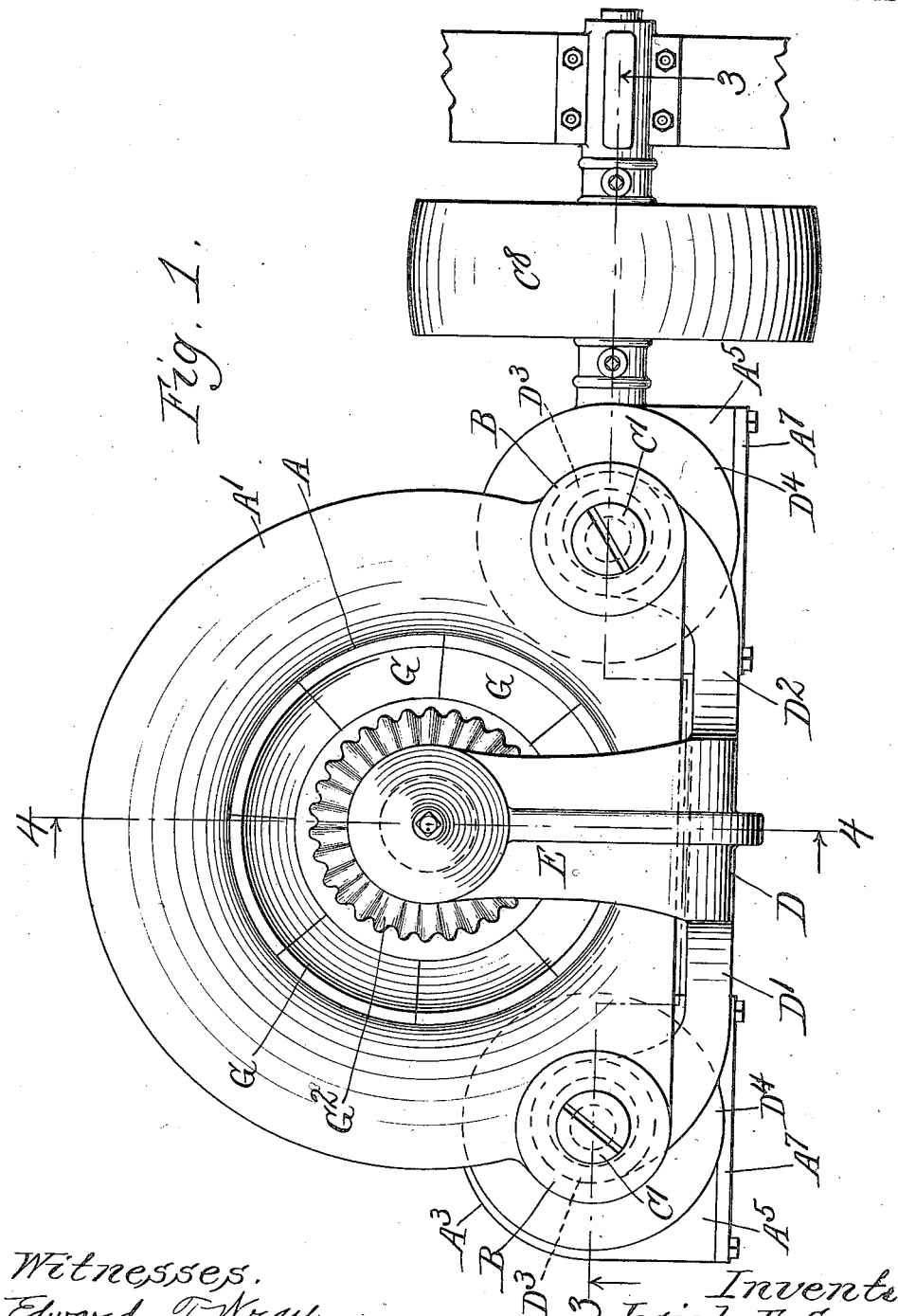
Figure 7:
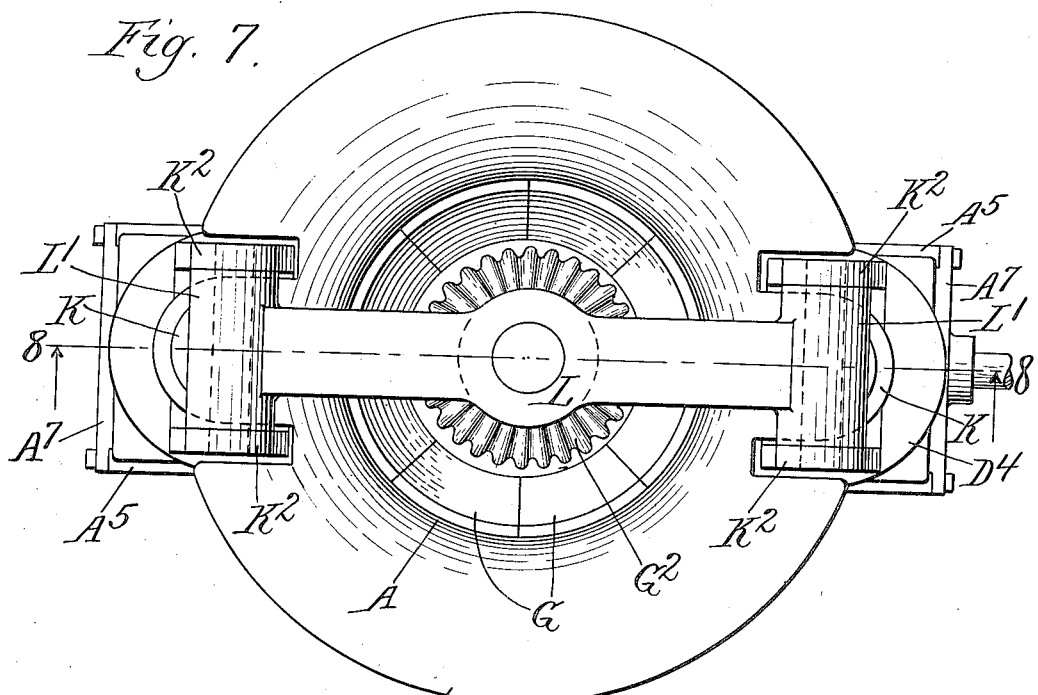
Figure 9:
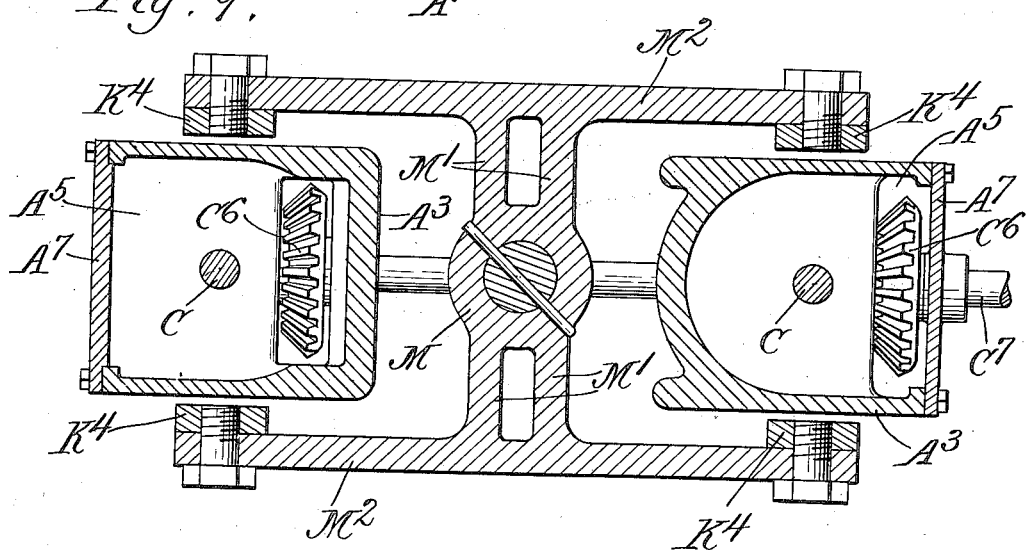

Figure 1 is a plan view of the preferred form, Fig. 2, an elevation, Fig. 3, a section along the line 3—3 of Fig. 1; Fig. 4, a section along the line 4—4 of Fig. 1, Fig. 5, a section along the line 5—5 of Fig. 3, Fig. 6, a plan view of one of the bearing members, Fig. 7, a plan view of a modified form of the device, Fig. 8, a section along the line 8—8 of Fig. 7, Fig. 9, a section along the line 9—9 of Fig. 8, Fig. 10, a detail of the eccentric sleeve.

Like parts are indicated by the same letters in all the figures.

The hopper A which is provided with the outwardly flaring upper rim $A^1$ has about its bottom the annular reinforcement $A^2$ which terminates at either side in the outwardly projecting lugs $A^3$ carrying the bearings $A^4$ and forming the bottom of the gear casing $A^5$ which is made up of the lateral walls $A^6$ and the removable sheets $A^7$. The rim $A^1$ has the two outwardly projecting lugs B located above one end of the lugs $A^3$. The shafts C which are mounted at one end in the lugs $A^3$ and held at the other end in the lugs B by means of the screw threaded plug $C^1$ are inclosed within the eccentric sleeves $C^2$ which are in slidable engagement at their top with the under side of the lugs B and at the bottom are mounted upon the angular rings $C^3$, $C^4$ upon the lugs $A^3$ and are driven by the miter gear $C^5$ in engagement with the gears $C^6$ upon the shaft $C^7$ which in turn is driven from any suitable source of power by the pulley $C^8$.

The cross shaped frame D is provided with the opposed arms $D^1$, $D^2$ which terminate at either end in the sleeves $D^3$ within which rotate the eccentrics $C^2$. The sleeves $D^3$ are provided near the bottom with the annular flanges $D^4$ riding upon the bearing members $D^5$ which in turn are mounted upon the bearing members which form a part of the closures for the gear casing $A^5$ and is provided with the knife edge $D^6$ in contact with the under surface of the flange $D^4$ to prevent the introduction of dust and grit into the gear casing. The frame D has at top and bottom the laterally projecting arms E, $E^1$ overhanging and underlying respectively the hopper A and carrying the shaft $E^2$ held rigid therein by means of the keys $E^3$. The hopper A is provided with the lining plates G having the backing $G^1$ and surrounds the conical corrugated crushing cone $G^2$ which is slidably mounted upon the shaft $E^2$ being held in adjustable position by the screw $G^3$, the head $G^4$ of which rests upon the flange $G^5$ of the bushing $G^6$ which surrounds the shaft $E^2$ and rests upon the arm $E^1$. The collar $G^7$ surrounds the shaft $E^2$ and is interposed between the top of the cone $G^2$ and the under side of the arm E to limit the upward excursion of the crushing cone.

The piping H leads from the oil tank not shown to the top of the eccentric $C^2$ and permits an oil circulation therethrough from the gear casing $A^5$ back to the tank by means of the piping $H^1$. The screw threaded ring $H^2$ in the top of the sleeve $D^3$ being provided with the laterally extending flange $H^3$ having the knife edge $H^4$ in engagement with the under side of the lug B completes the closure, thus permitting a dust proof oil tight casing within which operate all the driving parts of the machine.

In the modification illustrated in Figs. 7, 8, 9 and 10, the diametrically opposed lugs K are substituted for the lugs B as an upper support for the shaft C, the eccentric $C^2$ being inclosed within the sleeve $K^1$ which is provided with the upwardly extending arms $K^2$ at the top and laterally extending arms $K^3$ at the bottom having the downwardly extending lugs $K^4$. The shaft $E^2$ is supported at the top in the yoke L having at either end the hubs $L^1$ to engage the arms $K^2$ and is supported at the bottom in the hub M having the laterally projecting arms $M^1$ which are supported by the arms $M^2$ in pivotal engagement with the lugs $K^4$.

It will be evident that while I have shown in my drawings an operative device yet many changes might be made in size, shape and arrangement of the parts without departing from the spirit of my invention.

The use and operation of my invention are as follows: I provide a gyratory crusher comprising the usual hopper having the usual gyratory head mounted therein. This head is rigidly mounted upon a shaft, which shaft is mounted between the two arms of a U-shaped frame, which frame is in turn mounted upon sleeves without the hopper, said sleeves inclosing eccentric collars. The eccentric collars are adapted to rotate in unison thus giving each of the sleeves the same gyratory motion, which motion is in turn transmitted to the crushing head.

In the modified form of my device I provide a hopper, crushing head and driving mechanism in which the driving mechanism takes the form of two eccentric sleeves located diametrically opposed across the crusher and driving yokes, which in turn carry and drive the crushing head.

In my crushing machine when the driving shaft is operated the two eccentric sleeves are given a simultaneous motion in unison one with the other and the gyratory excursion of all the parts of the mechanism which are mounted upon and driven by these eccentrics will, of course, be constant. It will be evident, however, that it is essential that the gear ratios of the driving gears and driven gears in each case must be the same. When this is true I am enabled to provide a crushing machine having a crushing head within the hopper and driving means outside of the hopper but upon the same level. I thus retain the advantage of having a low lift, light weight crusher capable of doing the same work heretofore done by the crushers in which the crushing head was mounted upon a swinging shaft.

I claim:

1. A crushing machine comprising a hopper, a gyratory crusher head therein, and means outside of and out of line with the hopper for giving the crusher head a gyratory movement of constant amplitude at all points therealong, said means including a plurality of eccentric cylinders.

2. A crushing machine comprising a hopper, a gyratory crusher head therein, and means outside of and out of line with the hopper for giving the crusher head a gyratory movement of constant amplitude at all points therealong, said means including a plurality of eccentric cylinders and sleeves about said cylinders.

3. A crushing machine comprising a hopper, a gyratory crusher head therein, means outside of and out of line with the hopper for giving the crusher head a gyratory movement of constant amplitude at all points therealong, said means including a plurality of eccentric cylinders and sleeves about said cylinders, and connections from said sleeves to said head above and below said hopper.

4. A crushing machine comprising a hopper, a gyratory crusher head therein, means outside of the hopper for giving the crusher head a gyratory movement of constant amplitude at all points therealong, said means including a plurality of eccentric cylinders, sleeves about said cylinders, and connections from said sleeves to said head above and below the hopper.

5. A crushing machine comprising a hopper, a crushing head therein, and means outside of said hopper for giving the head a gyratory motion, said means comprising a plurality of eccentric sleeves rotating in unison.

6. A crushing machine comprising a hopper, a crushing head therein, and means outside of and on a level with the crushing zone for giving the head a gyratory motion, said means comprising a plurality of eccentric sleeves rotating in unison.

7. A crushing machine comprising a hopper, a crushing head therein, means outside of and out of line with said hopper for giving the head a gyratory motion, said means comprising a plurality of eccentric sleeves rotating in unison, and connections from said sleeves to said crushing head.

8. A crushing machine comprising a hopper, a crushing head therein, means outside of and on a level with the crushing zone for giving the head a gyratory motion, said means comprising a plurality of eccentric sleeves rotating in unison, and connections from said sleeves to said crushing head.

9. A crushing machine comprising a hopper, a crushing head therein, a shaft upon which said head is mounted, a movable frame supporting said shaft, and means for giving said crushing head and said frame a gyratory motion.

10. A crushing machine comprising a hopper, a crushing head therein, a shaft upon which said head is mounted, a movable frame supporting said shaft, and means for giving said crushing head and said frame a gyratory motion, said means comprising eccentric sleeves.

11. A crusher comprising a hopper and a crushing head, a shaft upon which said head is mounted, a movable frame supporting said shaft at either end, supporting sleeves upon said frame, and eccentric sleeves within said supporting sleeves rotatably mounted about a rigid shaft together with means for driving said eccentric sleeves in unison.

12. A crushing machine comprising a hopper, a gyratory crusher head therein, and means outside of the hopper for giving the crusher head a gyratory movement of constant amplitude at all points therealong.

13. A crushing machine comprising a hopper, a crusher head therein, a shaft upon which said head is rigidly mounted, and means for giving said head a gyratory movement of constant amplitude at all points therealong.

14. A crushing machine comprising a hopper, a crushing head and a vertically disposed supporting shaft therefor, a U-shaped yoke supported from outside the hopper and supporting the two ends of said shaft.

15. A crushing machine comprising a hopper, a crushing head and a vertically disposed supporting shaft therefor, a U-shaped yoke supporting the two ends of said shaft and inclosing one side of the hopper.

16. A crushing machine comprising a hopper, a crushing head and a supporting shaft therefor, a U-shaped yoke supporting the two ends of said shaft, arms carried by said yoke and terminating in sleeves inclosing rotating eccentrics.

17. A crushing machine comprising a hopper, a crushing head and a supporting shaft therefor, a U-shaped yoke supporting the two ends of said shaft and inclosing one side of the hopper, arms carried by said yoke and terminating in sleeves inclosing rotating eccentrics.

18. A crushing machine comprising a hopper, a crushing head and a supporting shaft therefor, a U-shaped yoke supporting the two ends of said shaft, and means for giving said yoke a gyratory movement.

19. A crushing machine comprising a hopper, a crushing head and a supporting shaft therefor, a U-shaped yoke supporting the two ends of said shaft and inclosing one side of the hopper, and means for giving said yoke a gyratory movement.

20. A crushing machine comprising a hopper, a crushing head and supporting shaft therefor and yokes supporting said shaft above and below the hopper and means for giving said yokes a gyratory movement.

21. A crushing machine comprising a hopper, a crushing head and supporting shaft therefor and yokes supporting said shaft above and below the hopper and means for giving said yokes a gyratory movement, said means comprising eccentrics located at either end of said yokes.

22. A crushing machine comprising a hopper, a crushing head therein and means out of line with and at one side of the hopper and located partially above and below it for giving the head a gyratory motion.

23. A crushing machine comprising a hopper, a crushing head therein and means comprising a plurality of parallel eccentric sleeves located at substantially the same level as the crushing head for giving the head the gyratory motion.

24. A crushing machine comprising a hopper, a crushing head therein and means outside of and on a level with the crushing zone and including eccentric sleeves for giving the machine the gyratory motion.

JOSIAH E. SYMONS.

Witnesses:
FRANCIS W. PARKER, Jr.,
LUCY A. FALKENBERG.